(12) United States Patent
Miller et al.

(10) Patent No.: US 9,534,691 B2
(45) Date of Patent: Jan. 3, 2017

(54) PACKING ASSEMBLY FOR A PUMP

(71) Applicants: John A. Miller, Weimar, TX (US); Robert H. Ash, Jr., Magnolia, TX (US)

(72) Inventors: John A. Miller, Weimar, TX (US); Robert H. Ash, Jr., Magnolia, TX (US)

(73) Assignee: UTEX Industries, Inc., Houston, TX (US)

( * ) Notice: Subject to any disclaimer, the term of this patent is extended or adjusted under 35 U.S.C. 154(b) by 393 days.

(21) Appl. No.: 14/459,869

(22) Filed: Aug. 14, 2014

(65) Prior Publication Data

US 2015/0377356 A1 Dec. 31, 2015

Related U.S. Application Data

(63) Continuation of application No. 13/954,672, filed on Jul. 30, 2013, now abandoned, which is a continuation of application No. 13/440,585, filed on Apr. 5, 2012, now abandoned, which is a continuation of application

(60) Provisional application No. 61/018,538, filed on Jan. 2, 2008.

(Continued)

(51) Int. Cl.
| | |
|---|---|
| *F16J 15/16* | (2006.01) |
| *F16J 15/18* | (2006.01) |
| *F16J 15/20* | (2006.01) |
| *F04B 53/02* | (2006.01) |
| *F04B 39/00* | (2006.01) |

(52) U.S. Cl.
CPC .......... *F16J 15/181* (2013.01); *F04B 39/0005* (2013.01); *F04B 53/02* (2013.01); *F16J 15/166* (2013.01); *F16J 15/20* (2013.01); *Y10T 29/49236* (2015.01)

(58) Field of Classification Search
CPC ................................ F16J 15/166; F16J 15/181
See application file for complete search history.

(56) References Cited

U.S. PATENT DOCUMENTS

| | | | |
|---|---|---|---|
| 2,953,398 A | 9/1960 | Haugen et al. | |
| 3,013,830 A | 12/1961 | Milligan | |
| 3,419,280 A | 12/1968 | Wheeler | |

(Continued)

FOREIGN PATENT DOCUMENTS

| | | |
|---|---|---|
| WO | WO 01/06086 | 1/2001 |
| WO | WO 2011/117602 | 9/2011 |

OTHER PUBLICATIONS

Office Action mailed Sep. 20, 2011, by the USPTO, regarding U.S. Appl. No. 12/347,207, 10 pages.

(Continued)

*Primary Examiner* — F. Daniel Lopez
(74) *Attorney, Agent, or Firm* — Haynes and Boone, LLP

(57) ABSTRACT

A header ring for use in a stuffing box comprising an annular body portion of an elastomeric material, an annular radially inward projecting sealing lip portion formed on said body portion and an annular, axially facing pedestal portion formed on said body portion, said pedestal portion defining an annularly extending radially inwardly facing pedestal surface, the sealing lip portion defining an annularly extending, radially inward facing sealing surface, the sealing surface and the pedestal surface forming a juncture, at least a portion of the pedestal portion adjacent the juncture and forming the pedestal surface and at least a portion of the sealing lip portion adjacent the juncture and forming a portion of the sealing surface being comprised of a layer of reinforced elastomeric material bonded to the body portion.

13 Claims, 3 Drawing Sheets

Related U.S. Application Data

No. 12/347,207, filed on Dec. 31, 2008, now abandoned.

(56) References Cited

U.S. PATENT DOCUMENTS

| | | |
|---|---|---|
| 4,138,144 A | 2/1979 | Pierce, Jr. |
| 4,310,163 A | 1/1982 | Pippert |
| 4,440,404 A | 4/1984 | Roach et al. |
| 4,510,994 A | 4/1985 | Pringle |
| 4,729,432 A | 3/1988 | Helms |
| 4,823,882 A | 4/1989 | Stokley et al. |
| 4,848,463 A | 7/1989 | Ringgenberg et al. |
| 4,893,678 A | 1/1990 | Stokley et al. |
| 5,462,121 A | 10/1995 | Schmuck et al. |
| 5,960,700 A | 10/1999 | Staggs et al. |
| 6,817,228 B2 | 11/2004 | Upton et al. |
| 6,907,936 B2 | 6/2005 | Fehr et al. |
| 7,108,067 B2 | 9/2006 | Themig et al. |
| 7,124,824 B2 | 10/2006 | Turner et al. |
| 7,134,505 B2 | 11/2006 | Fehr et al. |
| 7,322,417 B2 | 1/2008 | Rytlewski et al. |
| 7,377,321 B2 | 5/2008 | Rytlewski |
| 7,503,392 B2 | 3/2009 | King et al. |
| 7,543,634 B2 | 6/2009 | Fehr et al. |
| 7,628,210 B2 | 12/2009 | Avant et al. |
| 7,644,772 B2 | 1/2010 | Avant et al. |
| 7,681,650 B2 | 3/2010 | Telfer et al. |
| 7,861,774 B2 | 1/2011 | Fehr et al. |
| 8,215,401 B2 | 7/2012 | Braekke et al. |
| 8,261,761 B2 | 9/2012 | Gerrard et al. |
| 8,356,670 B2 | 1/2013 | Telfer |
| 8,397,820 B2 | 3/2013 | Fehr et al. |
| 8,479,822 B2 | 7/2013 | Hofman et al. |
| 8,479,823 B2 | 7/2013 | Mireles |
| 8,540,019 B2 | 9/2013 | Hofman et al. |
| 8,668,013 B2 | 3/2014 | O'Connell et al. |
| 8,783,365 B2 | 7/2014 | McCoy et al. |
| 8,789,600 B2 | 7/2014 | O'Connell et al. |
| 2006/0213670 A1 | 9/2006 | Bishop et al. |
| 2007/0017679 A1 | 1/2007 | Wolf et al. |
| 2007/0278017 A1 | 12/2007 | Shen et al. |
| 2008/0066924 A1 | 3/2008 | Xu |
| 2009/0308588 A1 | 12/2009 | Howell et al. |
| 2011/0278017 A1 | 11/2011 | Themig et al. |
| 2012/0048556 A1 | 3/2012 | O'Connell et al. |
| 2013/0068475 A1 | 3/2013 | Hofman et al. |
| 2013/0118732 A1 | 5/2013 | Chauffe |
| 2013/0133876 A1 | 5/2013 | Naedler et al. |
| 2013/0248201 A1 | 9/2013 | Jackson |
| 2013/0333891 A1 | 12/2013 | Fripp et al. |

OTHER PUBLICATIONS

Office Action mailed Dec. 12, 2011, by the USPTO, regarding U.S. Appl. No. 12/347,207, 8 pages.

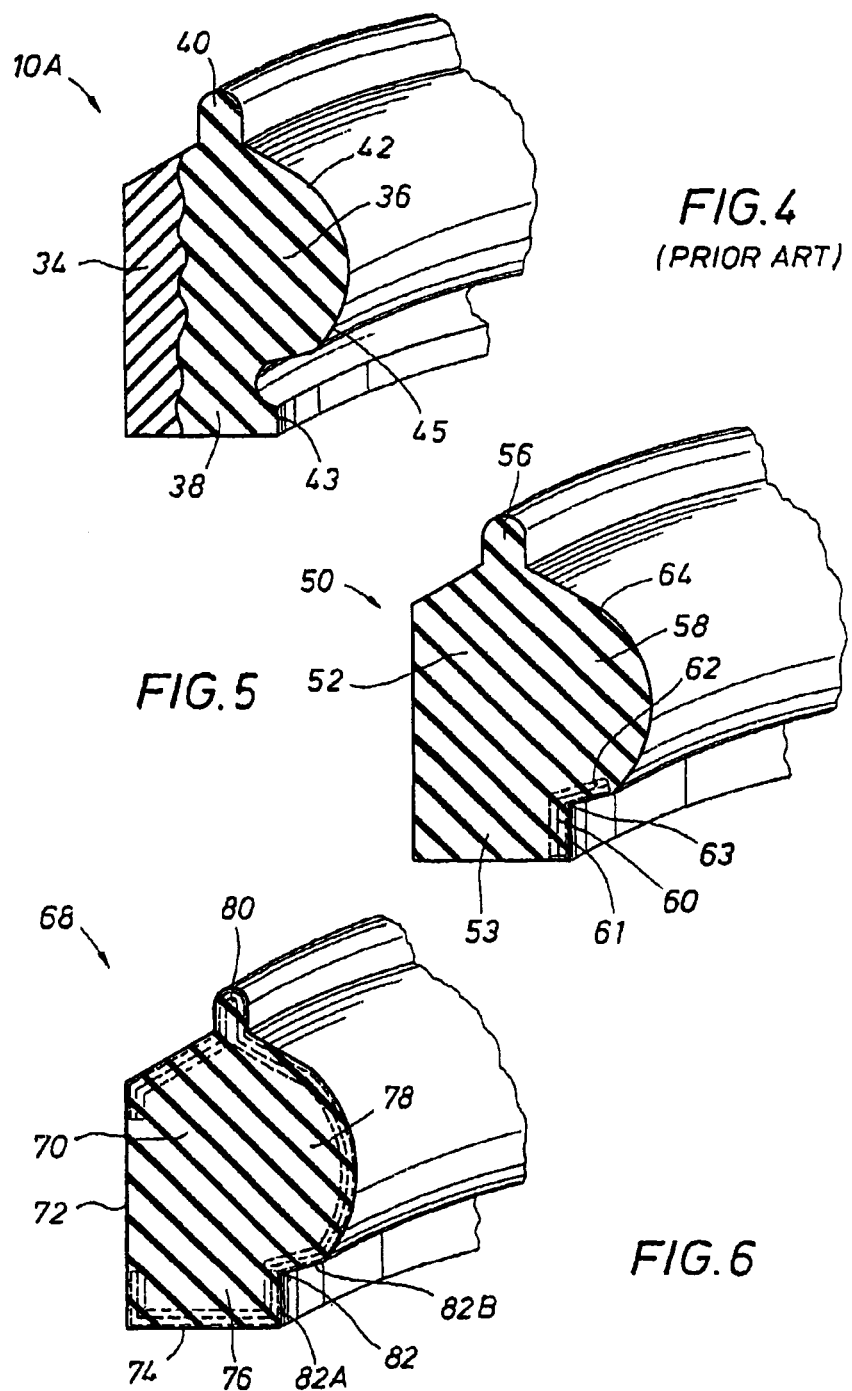

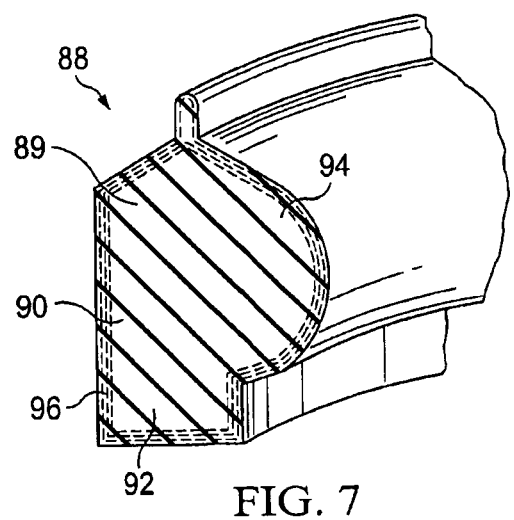
FIG. 7
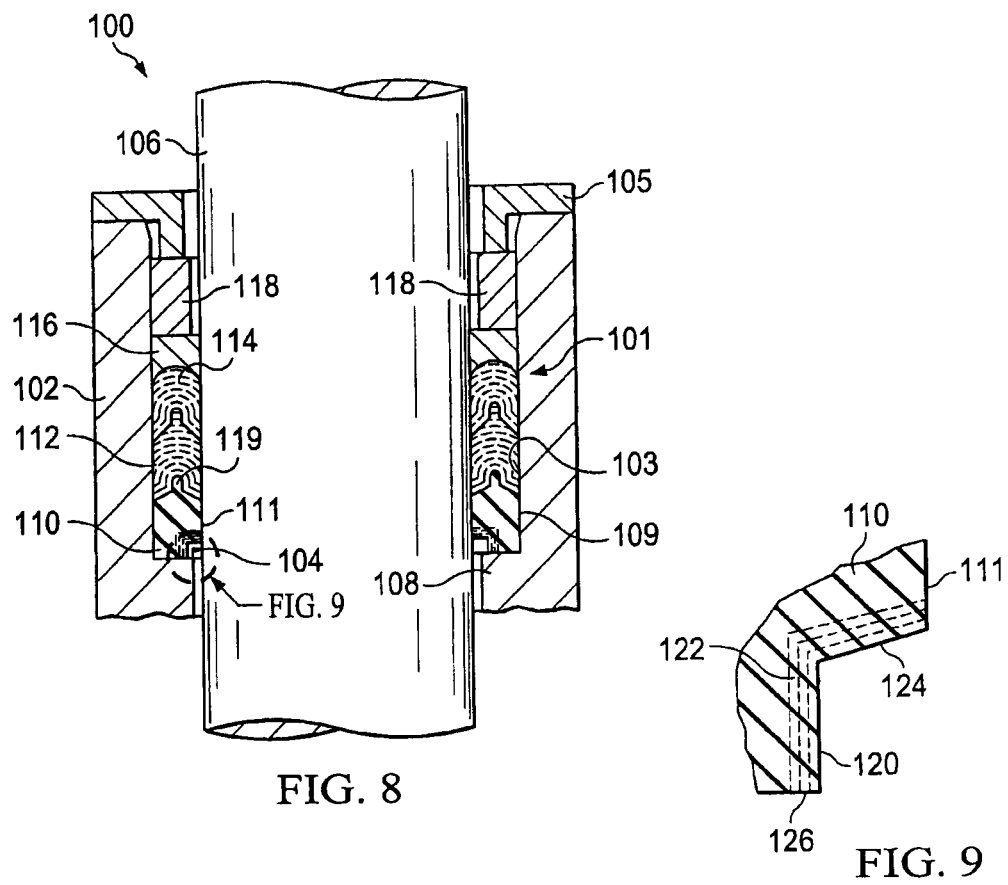
FIG. 8
FIG. 9

PACKING ASSEMBLY FOR A PUMP

CROSS REFERENCE TO RELATED APPLICATIONS

This application is a Continuation of U.S. patent application Ser. No. 13/954,672 filed Jul. 30, 2013, which is a Continuation of U.S. patent application Ser. No. 13/440,585, filed Apr. 5, 2012 now abandoned, which is a Continuation of U.S. patent application Ser. No. 12/347,207, filed Dec. 31, 2008 now abandoned, which claims the benefit of U.S. Provisional Application No. 61/018,538 filed on Jan. 2, 2008, the disclosures of which are incorporated herein by reference for all purposes.

BACKGROUND OF THE INVENTION

Field of the Invention

The present invention relates to a packing or seal assembly for a pump and more particularly to a header ring for use in such an assembly.

Description of Prior Art

Piston pumps or plunger pumps are positive displacement pumps and are commonly used in environments where the fluids which are being handled pose problems such as high temperatures, viscous and very viscous media or solids-charged liquids.

One important use of plunger pumps is in the oil and gas industry and particularly in the drilling, completion and/or stimulation of oil or gas wells. In these applications, it is common to employ solids laden drilling fluids, e.g., muds, cement slurries, fracturing slurries, acids and the like, which frequently must be pumped under high pressure into the well. This is particularly true in the case of completion and/or stimulation procedures where very high pressures are employed and the fluids being handled are typically slurries which make the fluids highly abrasive because of the large solids content of the slurries.

As is well known in the art, positive displacement reciprocating plunger-type pumps in this environment pose difficult sealing problems at the high pressure end where the abrasive fluid must be prevented from leaking between the reciprocating plunger and the cylinder or housing within which it reciprocates.

Although a variety of sealing or packing systems are known to seal between the reciprocating plunger and the cylinder, a typical seal arrangement comprises one or more V-shaped or Chevron packing rings with various male and female adaptor rings at the forward and rearward ends of the packing assembly. To ensure sealing between the plunger and the cylinder, the sealing assembly can be placed under compression by an adjusting ring, spring loading, etc.

A typical packing assembly of the type under discussion includes a header ring which is typically made of an elastomeric material. The header ring can be constructed of a homogeneous elastomeric material or an elastomeric material containing layers of cloth or other reinforcing type materials. It is also known to cover certain surfaces of the header ring, particularly the so-called rearward surfaces with a reinforcing fabric.

It has been found that, with respect to the header ring, failure of the sealing assembly primarily occurs due to a phenomena known as "nibbling." This nibbling phenomenon can be best understood by reference to FIGS. 1-4 which depict prior art construction for header rings of the type under consideration. FIG. 1 depicts a typical homogeneous elastomeric header ring shown as 10. As can be seen in FIG. 1, header ring 10 is made of a homogeneous elastomeric material and comprises an annular body portion 12.

Integrally formed with body 12, is an annular, radially inwardly projecting wiping lip 14, an annularly extending, axially facing bead 16, an annular pedestal portion 18. Header ring 10 includes a forwardly facing, annularly extending planar surface 20, an annularly extending, radially outwardly facing cylindrical surface 22, an annularly extending, radially inwardly facing cylindrical surface 24 and a radially inwardly facing convex sealing surface 26, surfaces 24 and 26 being adjoined at an annularly extending juncture 28.

Referring now to FIG. 2, the header ring 10 is shown after use and after a portion of the header ring has been nibbled out. As can be seen, the nibbled out area indicated at 30 comprises a portion of header ring 10 formed by intersecting surfaces 24 and 26. More specifically, it can be seen that the juncture 28 shown in FIG. 1 between surfaces 24 and 26 has been gouged out due to the nibbling effect.

FIGS. 3 and 4 depict another prior art header ring, FIG. 3 depicting the header ring in its original or undamaged state, FIG. 4 depicting the header ring of FIG. 3 following use and damage as a result of nibbling. The header ring 10A shown in FIG. 3 has a body portion 32 comprised of first body section 34 and second body section 36. Section 36 of body portion 32 comprises a fabric or fiber reinforced material while portion 34 is formed of a homogeneous elastomeric material construction. As in the case of header ring 10, there is an annular pedestal 38, an annular bead 40 and an annular sealing lip 42. FIG. 4 shows the header ring 10A of FIG. 3 which has been damaged due to nibbling and once again the nibbling has occurred at the juncture 46 between radially inwardly facing cylindrical wall 43 and radially inwardly facing surface 45.

SUMMARY OF THE INVENTION

In one aspect, the present invention provides a header ring for use in a packing or seal assembly between a reciprocating, cylindrical member and a cylindrical wall of a housing in which the cylindrical member reciprocates.

In one aspect, the header ring of the present invention has an annularly extending body portion, at least a portion of which comprises an elastomeric material, an annular pedestal portion formed on said body and having an annular, radially inwardly facing pedestal surface, a radially inwardly facing, annularly extending sealing lip formed on said body and having a radially inwardly facing sealing surface, at least a portion of the pedestal portion forming the pedestal surface and an at least a portion of the sealing lip forming at least a portion of the sealing surface being comprised of a layer of fabric reinforced elastomeric material.

In another aspect of the present invention, there is provided a sealing assembly for sealing between a cylindrical movable member and a housing having a cylindrical bore in which the cylindrical member reciprocates, the sealing assembly including a header ring as described above.

The foregoing objects, features and advantages of the present invention, as well as others, will be more fully understood and better appreciated by reference to the following drawings, specification and claims.

BRIEF DESCRIPTION OF THE DRAWINGS

FIG. 4 is a cross-sectional view of the header ring of FIG. 3 which has been damaged by nibbling.

FIG. 5 is a cross-sectional view of one embodiment of the header ring of the present invention.

FIG. 6 is a cross-sectional view of another embodiment of the header ring of the present invention.

FIG. 7 is a cross-sectional view of another embodiment of the header ring of the present invention.

FIG. 8 is a schematic view, partly in section, of a sealing assembly according to the present invention in the stuffing box of a plunger pump.

FIG. 9 is an enlarged view of the circled portion of the header ring shown in FIG. 8.

DESCRIPTION OF THE PREFERRED EMBODIMENTS

Figure 1:
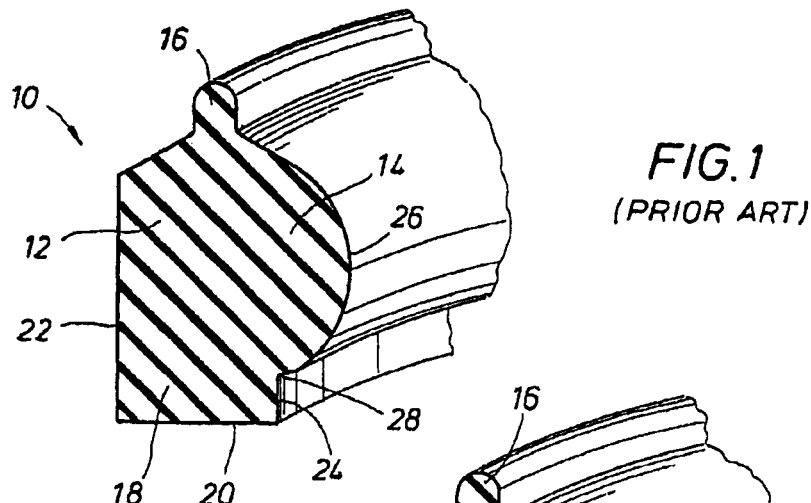
FIG. 1 is a cross-sectional view of a prior art header ring prior to installation.
Figure 2:
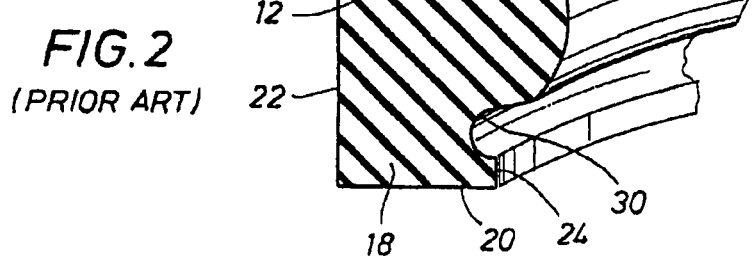
FIG. 2 is a cross-sectional view of the header ring of FIG. 1 which has been damaged by nibbling.
Figure 3:
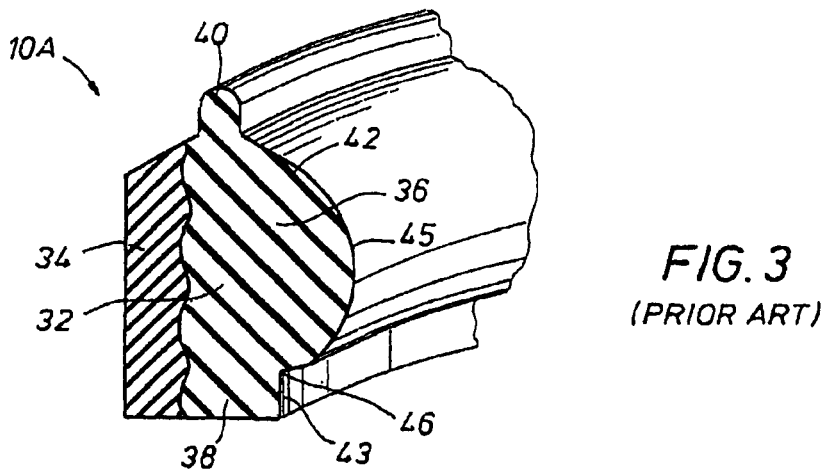
FIG. 3 is a cross-sectional view of another type of prior art header ring prior to installation.

Referring first to FIG. 5, the header ring 50 comprises an annular body portion 52, an annular axially extending pedestal 53, an annular, axially extending bead 56, distal the pedestal 53, and a radially inwardly facing, annularly extending sealing lip 58. As can be seen, body 52, bead 56, pedestal 53 and sealing lip 58 are integrally formed, for the most part, of a homogeneous, elastomeric material. However, a portion 60 of the pedestal 53 forming the radially inwardly facing cylindrical surface 61 and the portion 62 of the sealing lip 58 forming a portion of sealing surface 64 is comprised of a layer of reinforced, elastomeric material, bonded to the homogeneous elastomeric material of the remainder of header ring 50. As seen, the portions 60 and 62 extend over the juncture 63 of surfaces 61 and 64. When in the relaxed state as shown in FIG. 5, the fabric reinforced sections 60 and 62, when adjoined, are generally L-shaped when viewed in transverse cross-section.

FIG. 6 shows another embodiment of the present invention wherein the header ring 68 has an annular body portion 70 which is primarily made of a homogeneous elastomeric material. The header ring 68 has an annular, radially outwardly facing cylindrical surface 72. Bonded to the homogeneous elastomeric portion of body 70 is an annular layer 74 of a fabric reinforced elastomer, the layer 74 covering the surfaces of the pedestal 76, the sealing lip 78, the bead 80 and portions of the forward and rearward portions of the body 70 forming surface 72. As in the case of the embodiment shown in FIG. 5, the portions of the pedestal 76 and sealing lip 78 forming juncture 82 between the pedestal 76 and the sealing lip 78 is formed of a layer of fabric reinforced elastomeric material forming adjoining surfaces 82A and 82B.

Turning to FIG. 7, there is shown another embodiment of the present invention, wherein the header ring, shown generally as 88, has a body 89, the core 90 of which is comprised of an elastomeric material, a portion of annular pedestal 92 and a portion of annular sealing lip 94. Unlike the embodiment shown in FIG. 6, in the embodiment shown in FIG. 7, the reinforced fabric layer 96 completely encapsulates or surrounds the core 90 of body portion 89.

FIG. 8 depicts a typical sealing assembly 101 for use in a stuffing box, shown generally as 100, of a plunger-type pump employing a header ring of the present invention. Stuffing box 100 comprises a housing 102 having a bore 104 extending therethrough, bore 104 defining a cylindrical surface 103. Housing 102 also has a shoulder portion 108. Movably, e.g., reciprocally, positioned in bore 104 is a plunger, piston or shaft 106. Sealing assembly 101 comprises an annular gland 105, an annular header ring 110, an-annular, first seal ring 112, and an annular, second seal ring 114. The sealing assembly 101 also includes a top, annular adaptor ring 116 and an annular bushing 118. As can be seen, header ring 110 forms a wiper ring at the high pressure end of the sealing assembly 101, its primary function being to prevent abrasives/solids from entering the region where the seal rings 112 and 114 are positioned and thereby prevent excessive wear on seal rings 112 and 114. It is also to be noted that, as shown in FIG. 8, header ring 110 no longer has the shape shown in, for example, FIG. 5 since the radially inwardly extending sealing lip 111 has been compressed to effect sealing between the plunger 106 and the housing 102, the cylindrical surface 103 being in sealing engagement with an annular, radially outwardly facing surface 109 of the compressed header ring 110 which is generally cylindrical.

Referring now to FIG. 9, there is shown an enlargement of the circled portion of FIG. 8. As an example of the present invention, header ring 110 is constructed essentially the same as the header ring shown in FIG. 5 having a generally L-shaped, annularly extending reinforcing section or layer 120 that bridges the juncture 122 between the surface of sealing lip 124 and the surface of pedestal 126.

While packing assembly 101 has been shown as containing two seal rings of the chevron or V-shaped type, it will be appreciated that depending upon the use to which the plunger pump is subjected, fewer or more sealing rings can be employed. It will also be seen that the annular bead 119 of header ring 110 is nested in the annularly extending, axially facing groove in seal ring 112 so as to anchor seal ring 112 to the header ring 110. It will be appreciated that the seal rings 112 and 114 can be constructed of various materials and have various shapes, the only provision being that they have sufficient resiliency to effect sealing between the housing 102 and plunger 106. Generally speaking, components such as annular bushing 118, top adaptor 116, and annular gland 105 are made of a metallic material, e.g., brass.

The packing assembly 101 can be energized by header ring 110 and can be made to be adjustable by techniques well known in the art. If, however the packing assembly 101 is preloaded, care must be taken to ensure that the correct amount of preload is employed to prevent movement of the sealing assembly in the housing or stuffing box to prevent excessive wear on the sealing assembly. In this regard, if there is too little preload the packing will move in the housing wearing both the ID and OD of the seal rings as well as the header ring causing premature wear and in extreme cases causing wear in the stuffing box resulting in expensive repair or refurbishment. On the other hand, if the packing assembly is adjusted with too little preload, high friction forces cause accelerated wear of the header ring and the seal rings with premature failure.

The homogeneous elastomeric core of the header ring of the present invention can be made from a number of different natural or synthetic rubbers as, for example, nitrile or butadiene rubber, with a desired degree of hardness again depending upon the use to which the plunger pump is exposed. Likewise, the elastomeric portions of the seal rings 112 and 114 can be of various rubbers with desirable hardness. As indicated, the seal rings, e.g., seal rings 112 and 114, can be reinforced with fabric, can be homogeneous elastomeric materials, can have anti-extrusion portions, etc.

Sections 61 and 62 forming an anti-nibbling section, as seen in FIG. 5 indicated, are generally a fabric reinforced rubber, synthetic or natural. The term fabric as used with respect to the anti-nibbling wear section of the various embodiments of the present invention is used in the broadest sense and includes any cloth or cloth-like structure made by any technique such as knitting, weaving or felting of fibers of natural or synthetic materials as well as mixed fibers and includes, without limitation, fibers of cotton, nylon, polyester, polyester blends, aramid fibers, fiberglass fibers or any combination thereof.

The foregoing description and examples illustrate selected embodiments of the present invention. In light thereof, variations and modifications will be suggested to one skilled in the art, all of which are in the spirit and purview of this invention.

The invention claimed is:

1. A header ring for use in a positive displacement reciprocating plunger-type pump, the pump adapted to displace a fluid within a subterranean well, the pump comprising:
    a housing having a generally cylindrical bore extending therethrough and forming a generally radially inwardly facing housing cylindrical surface;
    a plunger reciprocally positioned in the bore, such that an annulus is formed between the housing cylindrical surface and the plunger;
    at least one annular sealing ring positioned in the annulus; and
    a header ring positioned in the annulus and engaged with one of the at least one annular sealing ring,
    wherein the header ring defines an opening through which the plunger extends, and,
    wherein the header ring has a resilient body comprising:
        a radially inwardly extending first annular portion adjacent the opening and engaged with the plunger,
        an axially extending second annular portion adjacent the opening,
        an axially extending third annular portion opposite the opening and engaged with the housing cylindrical surface,
        a radially extending fourth annular portion extending between the second and third annular portions,
        a fifth annular portion extending between the third annular portion and the radially inwardly extending first annular portion, and
        a layer of a fabric reinforced elastomeric material covering the radially inwardly extending first annular portion, the axially extending second annular portion, the radially extending fourth annular portion, and the fifth annular portion as well as axially spaced sections of the third annular portion, wherein the portion of the third annular portion that extends between the axially spaced sections is not covered by the layer of a fabric reinforced elastomeric material.

2. The header ring for use in a positive displacement reciprocating plunger-type pump of claim 1 wherein:
    the resilient header ring body is formed substantially entirely from a homogeneous elastomeric material.

3. The header ring for use in a positive displacement reciprocating plunger-type pump of claim 2 wherein:
    the homogeneous elastomeric material is selected from the group consisting of natural rubber and synthetic rubber.

4. The header ring for use in a positive displacement reciprocating plunger-type pump of claim 1, wherein the header ring further comprises an axially extending annular bead opposite the fourth annular portion, the bead being adjacent the radially inwardly extending first annular portion.

5. A header ring for use in a reciprocating plunger-type pump, the pump adapted to displace a fluid, comprising:
    a stuffing box housing having a generally cylindrical bore extending therethrough and forming a generally radially inwardly facing housing cylindrical surface;
    a plunger reciprocally extending through the stuffing box housing; and
    a sealing apparatus disposed within the stuffing box, the sealing apparatus having a high pressure end and including an annular sealing ring circumscribing and slidingly engaged by the plunger; and a header ring;
    wherein the header ring has forward facing surfaces and rearward facing surfaces, the forward facing surfaces being disposed at the high pressure end of the sealing apparatus and the rearward facing surfaces being engaged with the annular sealing ring,
    wherein the header ring defines an opening through which the plunger extends, and
    wherein the header ring has a resilient body formed of a non-fabric reinforced homogeneous elastomeric material, comprising:
        a radially inwardly extending first annular surface adjacent the opening and engaged with the plunger, wherein the radially inwardly extending first annular surface has a forward facing portion,
        an axially extending second annular surface opposite the opening and engaged with the housing cylindrical surface,
        a forward facing radially extending third annular surface extending between the first annular surface and the second annular surface,
        a rearward facing fourth annular surface extending between the second annular surface and the radially inwardly extending partially forward facing first annular surface, and
        a layer of a fabric reinforced elastomeric material covering at least the forward facing surfaces of the header ring.

6. The header ring for use in a positive displacement reciprocating plunger-type pump of claim 5 wherein:
    the homogeneous elastomeric material is selected from the group consisting of natural rubber and synthetic rubber.

7. The header ring for use in a positive displacement reciprocating plunger type pump of claim 5, wherein the header ring further comprises a rearward facing axially extending annular bead opposite the third annular surface, the bead being adjacent the first annular surface.

8. The header ring for use in a positive displacement reciprocating plunger type pump of claim 5, wherein the layer of a fabric reinforced elastomeric material covers the radially inwardly extending first annular surface, the axially extending second annular surface, the forward facing radially extending third annular surface, and the rearward facing fourth annular surface.

9. The header ring for use in a positive displacement reciprocating plunger type pump of claim 7, wherein the layer of a fabric reinforced elastomeric material covers the radially inwardly extending first annular surface, the axially extending second annular surface, the forward facing radially extending third annular surface, the rearward facing fourth annular surface and the rearward facing axially extending annular bead.

10. A header ring for use in a reciprocating plunger-type pump, the pump adapted to displace a fluid, comprising:
- a stuffing box housing having a generally cylindrical bore extending therethrough and forming a generally radially inwardly facing housing cylindrical surface;
- a plunger reciprocally extending through the stuffing box housing; and
- a sealing apparatus disposed within the stuffing box, the sealing apparatus having a high pressure end and comprising (i) an annular sealing ring circumscribing and slidingly engaged by the plunger and (ii) a header ring;
- wherein the header ring has forward facing surfaces and rearward facing surfaces, the forward facing surfaces being disposed at the high pressure end of the sealing apparatus and the rearward facing surfaces being engaged with the annular sealing ring,
- wherein the header ring defines an opening through which the plunger extends, and
- wherein the header ring has a resilient body comprising:
    - a radially inwardly extending first annular portion adjacent the opening and engaged with the plunger, the radially inwardly extending first annular portion having a forward facing portion,
    - an axially extending second annular portion adjacent the opening,
    - an axially extending third annular portion opposite the opening and engaged with the housing cylindrical surface,
    - a forward facing radially extending fourth annular portion extending between the second and third annular portions,
    - a rearward facing fifth annular portion extending between the third annular portion and the radially inwardly extending first annular portion, and
    - a layer of a fabric reinforced elastomeric material covering at least the forward facing portion of the radially inwardly extending first annular portion and the axially extending second annular portion.

11. The header ring for use in a positive displacement reciprocating plunger-type pump of claim 10 wherein:
   the resilient header ring body is formed substantially entirely from a homogeneous elastomeric material.

12. The header ring for use in a positive displacement reciprocating plunger-type pump of claim 11 wherein:
   the homogeneous elastomeric material is selected from the group consisting of natural rubber and synthetic rubber.

13. The header ring for use in a positive displacement reciprocating plunger type pump of claim 10, wherein the header ring further comprises a rearward facing axially extending annular bead opposite the fourth annular portion, the bead being adjacent the first annular portion.

* * * * *